United States Patent [19]
Yang

[11] Patent Number: 6,140,748
[45] Date of Patent: Oct. 31, 2000

[54] HIGH VOLTAGE SENSITIVITY CORIOLIS FORCE DRIVEN PEIZOELECTRIC TRANSFORMER-GRYOSCOPE SYSTEM, AND METHOD OF USE

[75] Inventor: Jiashi Yang, Lincoln, Nebr.

[73] Assignee: Board of Regents of the University of Nebraska, Lincoln, Nebr.

[21] Appl. No.: 09/271,791

[22] Filed: Mar. 18, 1999

[51] Int. Cl.[7] .............................. G01P 9/04; G01P 15/09; H01L 41/08
[52] U.S. Cl. ........................ 310/359; 310/357; 310/370
[58] Field of Search .................... 310/318, 357, 310/359, 370

[56] References Cited

U.S. PATENT DOCUMENTS

| | | | |
|---|---|---|---|
| 3,141,100 | 7/1964 | Hart | 310/366 |
| 3,143,889 | 8/1964 | Simmons et al. | 73/504.16 |
| 3,258,617 | 6/1966 | Hart | 310/366 |
| 3,736,446 | 5/1973 | Berlincourt et al. | 310/8 |
| 4,253,036 | 2/1981 | Kizaki | 310/361 |
| 4,628,734 | 12/1986 | Watson | 73/505 |
| 5,336,960 | 8/1994 | Shimizu et al. | 310/369 |
| 5,504,384 | 4/1996 | Lee et al. | 310/359 |
| 5,747,914 | 5/1998 | Huang et al. | 310/318 |
| 5,854,427 | 12/1998 | Terada et al. | 73/504.16 |
| 5,987,987 | 11/1999 | Watarai | 73/504.16 |
| 6,018,997 | 2/2000 | Kumada et al. | 73/504.16 |

FOREIGN PATENT DOCUMENTS 11-112267   4/1999   Japan ..................... 310/359

*Primary Examiner*—Thomas M. Dougherty
*Attorney, Agent, or Firm*—James D. Welch

[57] ABSTRACT

Disclosed is a high voltage sensitivity coriolis force driven piezoelectric-gyroscope-transformer system, and method of its use. The system is of a preferably generally elongated rectangular solid shape and provides two stacked regions of oppositely polarized direction driving side piezoelectric material on a first longitudinally disposed side thereof, and two adjacent regions of longitudinally oppositely polarized direction sensing side piezoelectric material on a second longitudinally disposed side thereof. In use the system is caused to rotate about a essentially centrally located longitudinally oriented axis therethrough from the first longitudinally disposed side to the second, while a flex effecting driving voltage is applied across the two stacked regions of said oppositely polarization direction driving side piezoelectric material on the first longitudinally disposed side and an output voltage is sensed at the end of the second longitudinally disposed, sensing side. Also described are tuning-fork shaped piezoelectric-gyroscope-transformer systems made from present invention combination piezoelectric-gyroscope-transformer system(s).

14 Claims, 3 Drawing Sheets

HIGH VOLTAGE SENSITIVITY CORIOLIS FORCE DRIVEN PEIZOELECTRIC TRANSFORMER-GRYOSCOPE SYSTEM, AND METHOD OF USE

TECHNICAL FIELD

The present invention relates to piezoelectric systems, and more particularly to a high voltage sensitivity coriolis force driven, combination piezoelectric transformer and gyroscope system, and method of its use. The primary embodiment of said present invention system is of a generally elongated, preferably rectangular solid, shape comprising two stacked regions of oppositely, (eg. vertically oriented), polarized direction piezoelectric material on a first longitudinally disposed, driving, side thereof, and two adjacent regions of oppositely, (eg. longitudinally horizontally oriented), polarized direction piezoelectric material on a second longitudinally disposed, sensing, side thereof. The plane of the polarization directions on said second longitudinally disposed side is rotated ninety (90) degrees, (eg. horizontally oriented), from the plane of the polarization directions, (eg. vertically oriented), on said first longitudinally disposed side about an essentially centrally oriented longitudinal axis thereof which projects therethrough from the first to said second longitudinally disposed side. In use said system is caused to rotate about said essentially centrally located longitudinally oriented axis while a flex inducing driving voltage is applied at upper and lower surfaces of said two stacked regions of said oppositely, (eg. vertically oriented), polarization direction driving side piezoelectric material, and an output voltage is sensed at the end, (eg. vertically oriented), of said second longitudinally disposed sensing side thereof. In addition, one or two present invention high voltage sensitivity coriolis force driven piezoelectric transformer-gyroscope systems can be fashioned into a tuning fork configuration.

BACKGROUND

Voltage amplifying piezoelectric-transformers, (Rosen transformers), which are typically of a generally elongated rectangular solid shape and comprise piezoelectric material in which are present two regions of different polarization directions, are known. As viewed in front elevational cross-section, such a piezoelectric-transformer can be described as having, at one longitudinally disposed side thereof, a region of vertically oriented polarization direction material with driving voltage electrodes attached thereto at upper and lower surfaces thereof, one of which is considered to be a reference electrode. On an opposite longitudinally disposed side thereof there is present a region of horizontally oriented polarization direction material with an output electrode attached at the vertically oriented end thereof. In use a voltage applied across the driving voltage electrodes appears amplified at the output electrode, (with respect to the reference electrode).

Also known are generally elongated rectangular solid shaped Piezoelectric gyroscopes which serve to produce a voltage at sensing electrodes thereof which is proportional to an angular rotation velocity of said piezoelectric-gyroscope about a longitudinally oriented axis therethrough. The mechanism of operation involves Coriolis force mediated flexure in a direction which is perpendicular to both said longitudinal axis, and a direction of an applied driving voltage effected flex. As viewed in front elevational cross-section, such a piezoelectric gyroscope has, at one longitudinally disposed side thereof, two vertically stacked, (ie. one atop the other), regions of vertically oriented polarization direction material sandwiched between driving voltage electrodes attached thereto at upper and lower surfaces. One of said vertically stacked regions of vertically oriented polarization direction material has an upward polarization direction and the other a downward polarization direction. On an opposite longitudinally disposed side thereof, and as viewed in side elevation there are present two adjacent regions of horizontally oriented polarization direction material, (ie. one in front of the other as viewed in frontal elevation), sandwiched between sensing voltage electrodes attached thereto at front and back vertically oriented surfaces. One said adjacent region of horizontally oriented polarization direction material having, as viewed from atop thereof, a horizontal laterally to the right projecting polarization and the other said adjacent region of horizontally oriented polarization direction material having a horizontal laterally to the left oriented polarization direction. That is, the polarization plane and polarization directions on said second longitudinally disposed side are simply rotated ninety (90) degrees, (eg. horizontally oriented), from the plane of the polarization directions, (eg. vertically oriented), on said first laterally disposed side about said longitudinally oriented axis therethrough.

In use said Piezoelectric gyroscope is caused to rotate at an angular rotation velocity about said longitudinally oriented axis, which projects essentially centrally therethrough from said first longitudinally disposed side to said second longitudinally disposed side, and a flex effecting voltage is applied across the driving electrodes while an output voltage is sensed across said sensing electrodes. When both angular rotation velocity about said longitudinally oriented axis therethrough, and flex effecting voltage is present across the driving electrodes, it occurs that, (through the mechanism of Coriolis force), a voltage appears at the sensing electrodes which is related to said angular rotation velocity about said longitudinally oriented axis therethrough. Where the angular rotational velocity about said longitudinally oriented axis therethrough is at least an order of magnitude less than is the natural vibrational frequency of the piezoelectric gyroscope material, the output voltage at the sensing electrodes is typically directly proportional to said angular rotational velocity.

A problem with Piezoelectric gyroscope systems, however, is that the output voltage produced thereby is often of a magnitude which is less than optimum. To date no known system seeks to overcome said shortcoming by application of principals inherent in the operation of Piezoelectric-transformers.

It is also known that materials which are well suited for use in Piezoelectric-transformers and gyroscopes are ceramics in which can be effected regions of polarization direction by a "Polling procedure". Ceramics are inherently isotropic so that polarization can be determined by application of an electric field across the materials in excess of the coercive field thereof, (which is typically on the order of 1 MV/m), while raising the temperature of the material above the Curie point, and then cooling the material below this point to lock-in the induced domain structure. A reference which describes this procedure is titled "Smart Structures and Materials", Culshaw, Artech House, (1996).

A with an eye to the present invention a search of Patents was conducted, with the result being that very little was found, and nothing obviating of the present invention system was identified. Three Patents which describe angular or rotation measuring systems comprised of piezoelectric materials are:

U.S. Pat. No. 3,143,889 to Simmons et al., which provides for electrodes to be present on a piezoelectric material on top and bottom surfaces and on front and back surfaces.

U.S. Pat. No. 3,258,617 to Hart describes a piezoelectric system which positions sensing electrodes, (see (23) and (24) of FIG. 2 therein), at both the ends of a preferably rectangular shaped mass of piezoelectric material.

U.S. Pat. No. 3,141,100 to Hart describes a rather complex system comprised of a plurality of crystal quartz elements.

U.S. Pat. No. 3,736,446 to Berlincourt et al., describes a piezoelectric transformer with an electrode (17) at an end of a preferably rectangular shaped mass of piezoelectric material. This Patent also shows a system structure with various regions of polarization direction material present therein. Reference to FIG. 1 therein shows two regions (13) and (14) of oppositely directed vertical polarization at the leftmost side thereof as viewed in said FIG. 1, and with a region of horizontally polarized material at the right side (12) as so viewed.

U.S. Pat. No. 5,504,384 to Lee et al. shows another piezoelectric transformer with electrodes (11) and (12) at ends of an essentially rectangular shaped block of piezoelectric material. Also described are various regions of polarization present therein. Reference to FIG. 2 in said 384 Patent shows horizontally oppositely directed regions of piezoelectric material at laterally disposed ends of the essentially rectangular shaped block of piezoelectric material, with oppositely directed vertically polarized regions of piezoelectric material centrally located therewithin.

Articles which describe conventional Piezoelectric transformers and gyroscopes are:

A paper titled "Piezoelectric-Ceramic Cylinder Vibratory Gyroscope", by Hbe et al., Jpn. J. Appl. Phys., Vol. 31, (1992), describes a piezoelectric gyroscope with a cylindrical structure.

Another paper titled "Consideration On Equivalent Mechanical Circuits For Vibratory Gyroscope", by Kudo et al., IEEE Ultrasonics Symo., (1990) describes equations of gyro-motion and proposes many vibratory gyroscopes including one utilizing rotation motion in a double resonate vibrator system.

Another paper titled "Piezoelectric Vibratory Gyroscope Using Flexural Vibration Of A Triangular Bar", by Fujishima et al., IEEE Forth-Fifth Annual Symp. on Freq. Control, (1991), describes basic principals of a piezoelectric vibratory gyroscope and discloses development of a unique triangular bar flexural vibratory piezoelectric gyroscope.

A paper titled "Mathematical Theory Of The Fork-Type Wave Gyroscope", IEEE International Frequency Control Symposium, (1995) describes operation of Fork-type gyroscopes.

Another paper which describes Fork-type Vibratory Gyroscopes is titled "LiTaO$_3$ Crystal Fork Vibratory Gyroscope" by Wakatsuki et al., IEEE Ultrasonics Symposium, (1994).

Additionally, a paper titled Finite Element Analysis Of Single Crystal Tuning Forks For Gyroscopes", by Kudo et al., IEEE Intl. Freq. Control Symp., (1996), describes the results of applying finite element analysis to tuning fork gyroscopes.

Even in view of the identified known prior art, there remains need for a piezoelectric gyroscope system which provides increased signal output by coupling the voltage amplification benefits of piezoelectric (Rosen) transformers to the angular velocity measuring capabilities of piezoelectric-gyroscopes.

DISCLOSURE OF THE INVENTION

In a very broad sense, the present invention can be described as a piezoelectric gyroscope system comprising a generally longitudinally elongated three dimensional mass of piezoelectric material having first and second longitudinally disposed sides, said piezoelectric gyroscope system being distinguished in that a sensing electrode is present at one terminal end thereof, said sensing electrode being affixed so that it is oriented other than on a longitudinally oriented side of said piezoelectric gyroscope. Typically, said terminal end of said present invention piezoelectric gyroscope system, whereat said sensing electrode is affixed, is accurately described as oriented in a direction perpendicular to the direction of longitudinal elongation, and the generally longitudinally elongated three dimensional mass of piezoelectric material is a selected to be of a rectangular solid shape.

Continuing, it is to be understood that the present invention couples the voltage amplification benefits of piezoelectric (Rosen) transformers to the angular velocity measuring capabilities of piezoelectric-gyroscopes, by placing a sensing electrode in a piezoelectric-gyroscope much as is done in piezoelectric-transformers, (eg. as viewed in elevation, at a vertically oriented end of a longitudinally disposed side of a present invention piezoelectric-gyroscope at which is present two regions of horizontally longitudinally oriented polarization direction material). That is, the two sensing electrodes in a conventional piezoelectric-gyroscope, described above as adjacent to regions of horizontally, laterally oriented polarization direction material, (ie. one in front of the other as viewed in frontal elevation), sandwiched between sensing voltage electrodes attached thereto at front and back surfaces, are, in the preferred embodiment of the present invention, replaced by a single electrode at a vertically oriented end of the longitudinally disposed side of the present invention piezoelectric-gyroscope at which is present the two adjacent regions of horizontally longitudinally oriented polarization direction material. Said single electrode can reference to one of the driving electrodes, or to a second sensing electrode, (as is best appreciated by reference to the Drawings as described in the Detailed Description Section of this Disclosure).

A preferred embodiment of the present invention Piezoelectric Gyroscope, which serves to couple the voltage amplification benefits of piezoelectric (Rosen) transformers to the angular velocity measuring capabilities of conventional piezoelectric gyroscopes, can be described as comprising a generally elongated, typically rectangular solid shaped block of piezoelectric material having first and second longitudinally disposed sides and a longitudinally oriented axis which projects essentially centrally therethrough from said first longitudinally disposed side to said second longitudinally disposed side thereof. At the first longitudinally disposed side thereof there are present two, vertically stacked, regions of oppositely oriented polarization direction material sandwiched between driving voltage electrodes. One of said vertically stacked regions of oppositely oriented polarization direction material has, for instance, an "upward" polarization direction and the other a "downward" polarization direction. And on the second longitudinally disposed side thereof there are two adjacent regions of oppositely oriented polarization direction material, one said adjacent region of oppositely oriented polarization direction material having, for instance, a longitudinally "to the right" projecting polarization and the other said adjacent region of oriented polarization direction material having a longitudinally "to the left" oriented polarization direction. The plane of the polarization directions on said second longitudinally disposed side is rotated ninety (90) degrees from the plane of the polarization directions on said first longitudinally disposed side. Said piezoelectric-gyroscope further has a sensing electrode present at a vertically oriented end of the second longitudinally disposed side of the present invention piezoelectric-gyroscope.

In use said piezoelectric gyroscope is caused to rotate at an angular rotation velocity about said longitudinally oriented axis which projects essentially centrally therethrough from said first longitudinally disposed side to said second longitudinally disposed side, and a flex effecting voltage is applied across the driving electrodes, while an output voltage is sensed at said sensing electrode. The end result is that when both:

angular rotation velocity about said longitudinally oriented axis which projects essentially centrally therethrough from said first longitudinally disposed side to said second longitudinally disposed side, and flex effecting voltage is applied across the driving electrodes, it occurs that, through the mechanism of Coriolis force, a voltage which is related to said angular rotation velocity about said longitudinally oriented axis therethrough, appears at the sensing electrode.

It is disclosed that a preferred piezoelectric gyroscope which couples thereinto the voltage amplification benefits of piezoelectric (Rosen) transformers, provides that the monitored angular rotational velocity about said longitudinally oriented axis which projects essentially centrally therethrough from said first longitudinally disposed side to said second longitudinally disposed side is at least an order of magnitude less than is natural vibrational frequency of the generally elongated rectangular solid shaped block of piezoelectric material of said piezoelectric gyroscope, and the output voltage at the sensing electrodes is, as a result, essentially directly proportional to said angular rotational velocity.

It is also disclosed that the ceramic is the preferred rectangular solid shaped block of piezoelectric material, because, as alluded to in the Background Section of this Disclosure, ceramic is inherently isotropic and it is relatively easy to induce regions of polarization therein. However, use of any functional material is to be considered within the scope of the present invention, with another very relevant candidate being, for instance, lithium niobate.

A method of monitoring an angular rotation velocity comprising the steps of:

a. providing a present invention piezoelectric gyroscope which couples thereinto the voltage amplification benefits of piezoelectric (Rosen) transformers to the angular velocity measuring capabilities of conventional piezoelectric gyroscopes, as described infra herein;

said method further comprising in a functional order the steps of:

b. causing said piezoelectric gyroscope to rotate about said longitudinally oriented axis which projects essentially centrally therethrough from said first longitudinally disposed side to said second longitudinally disposed side and applying a flex effecting voltage across the driving electrodes; and c. monitoring an output voltage at said sensing electrode, said monitored output voltage being related to said angular velocity of rotation about said longitudinally oriented axis which projects essentially centrally therethrough from said first longitudinally disposed side to said second longitudinally disposed side.

Continuing, it is to be understood that a Tuning-fork shaped Piezoelectric Gyroscope can be configured from a single, or two, two present invention piezoelectric gyroscopes. That is:

the first longitudinally disposed driving side vertically stacked regions of oppositely vertically directed polarization direction material portion of a single present invention piezoelectric gyroscope can be positioned as one projecting element of a Tuning-fork shaped Piezoelectric Gyroscope, and the second longitudinally disposed horizontally longitudinally polarized adjacent sensing side regions of oppositely longitudinally oriented polarization direction material can be configured as the second side of said Tuning-fork shaped Piezoelectric Gyroscope, or two complete present invention Piezoelectric Gyroscopes as described infra herein can be positioned, one in each leg, of a Tuning-Fork shaped Piezoelectric Gyroscope.

(Said configurations are best appreciated by reference to FIGS. 5a and 5b in this Disclosure.)

A Tuning-fork piezoelectric gyroscope system can be described as comprising, as viewed in upright frontal elevation, a horizontally oriented base from which vertically project two independent piezoelectric gyroscope systems. Each of said independent piezoelectric gyroscope systems couples the voltage amplification benefits of piezoelectric (Rosen) transformers to the angular velocity measuring capabilities of conventional piezoelectric gyroscopes, and each thereof comprising a generally elongated rectangular solid shaped block of piezoelectric material having first and second longitudinally disposed sides. At the first longitudinally disposed side of each thereof are present two stacked regions of oppositely oriented polarization direction material sandwiched between driving voltage electrodes, one of said stacked regions of oppositely oriented polarization direction material having a relative "to the right" polarization direction and the other a relative "to the left" polarization direction. On the second longitudinally disposed side of each thereof are two adjacent regions of oppositely oriented polarization direction material, one said adjacent region of oppositely oriented polarization direction material having a relative longitudinal "upward" projecting polarization and the other said adjacent region of oriented polarization direction material having a relative longitudinal "downward" oriented polarization direction, the plane of the polarization directions on said second longitudinally disposed side being rotated ninety (90) degrees from the plane of the polarization directions on said first longitudinally disposed side. Each of said independent piezoelectric-gyroscope systems has a sensing electrode present at an essentially horizontally oriented end of the second longitudinally disposed side of thereof; such that in use said base is caused to rotate at an angular rotation velocity about an axis which projects essentially centrally between said two independent piezoelectrid-gyroscope systems and a flex effecting voltage is applied across the driving electrodes of each of said two independent piezoelectric gyroscope systems, while an output voltage is sensed between the sensing electrode of one of said independent piezoelectric-gyroscope system and that of the other.

An alternative and simpler description of a present invention Tuning-fork piezoelectric gyroscope system provides for the presence of a base from which independently project, essentially perpendicularly to said base, two piezoelectric gyroscope systems. Both thereof comprise a generally longitudinally elongated three dimensional mass of piezoelectric material having a sensing electrode present at an end thereof, which end is not in contact with said base.

Another alternative, simpler, description of a present invention Tuning-fork piezoelectric gyroscope system provides for the presence of a base from which independently project, essentially perpendicularly to said base, two elements of a piezoelectric gyroscope system. Both of said elements comprise a generally longitudinally elongated three dimensional mass of piezoelectric material and one has a sensing electrode present at an end thereof, which end is not in contact with said base.

While application of the Tuning-fork configuration in Piezoelectric Gyroscopes is not, per se. new, it is emphasized that use of one or two present invention Piezoelectric Gyroscopes as described infra herein, to form said Tuning-fork configuration, is new.

The present invention will be better appreciated, (particularly as regards the language "vertically stacked" and "horizontally longitudinal oriented" and "horizontally lateral oriented" etc., by reference to the Detailed Description Section of this Disclosure, with appropriate reference to the accompanying Drawings.

SUMMARY OF THE INVENTION

It is therefore a primary purpose of the present invention to teach a piezoelectric gyroscope which incorporates the voltage amplification benefits of piezoelectric (Rosen) transformers.

DETAILED DESCRIPTION

Figure 1:
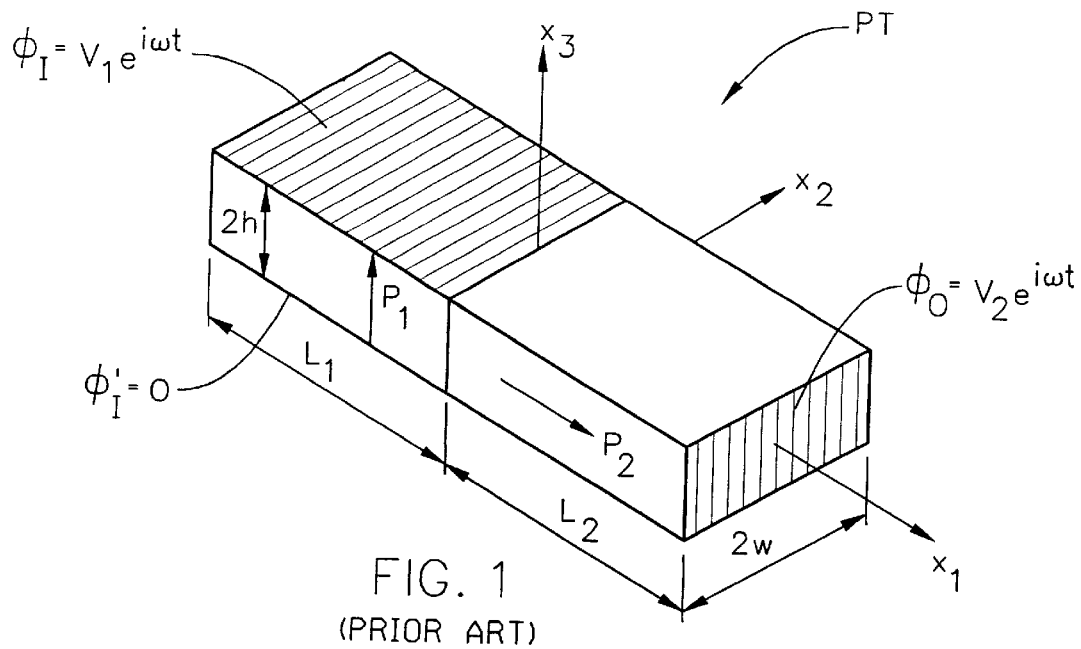
FIG. 1 shows a prior art Piezoelectric-transformer.

Turning now to FIG. 1, there is shown a Voltage amplifying piezoelectric-transformer (PT), (ie. a Rosen transformer), which is of a generally elongated rectangular solid shape of $(x_3)$ direction height (2H), $(x_1)$ direction Length (l1)+(l2), and $(x_2)$ direction Width (2W). The piezoelectric material is shown to comprise two regions of different polarization directions (P1) and (P2). FIG. 1 shows that it the piezoelectric-transformer has, at the left longitudinally disposed side thereof, a region of vertically oriented polarization direction (P1) material with driving voltage electrodes attached thereto at upper ($\phi_I$) and lower ($\phi'_I$) surfaces, one of which ($\phi_I$) and ($\phi'_I$) is considered to be a reference electrode. On the right longitudinally disposed side there is show a region of horizontally longitudinally oriented polarization direction (P2) material with an output electrode ($\phi_O$) attached at the vertical end thereof. In use an extension effecting voltage (V1) applied across the driving voltage electrodes and ($\phi_I$) and ($\phi'_I$) appears amplified at the output electrode ($\phi_O$). Said output voltage (V2) is referenced to the reference input input electrode ($\phi'_I$). It is noted that the output voltage gain transfer function is:

$$V2/V1 \alpha (l_2/2h).$$

Figure 2:
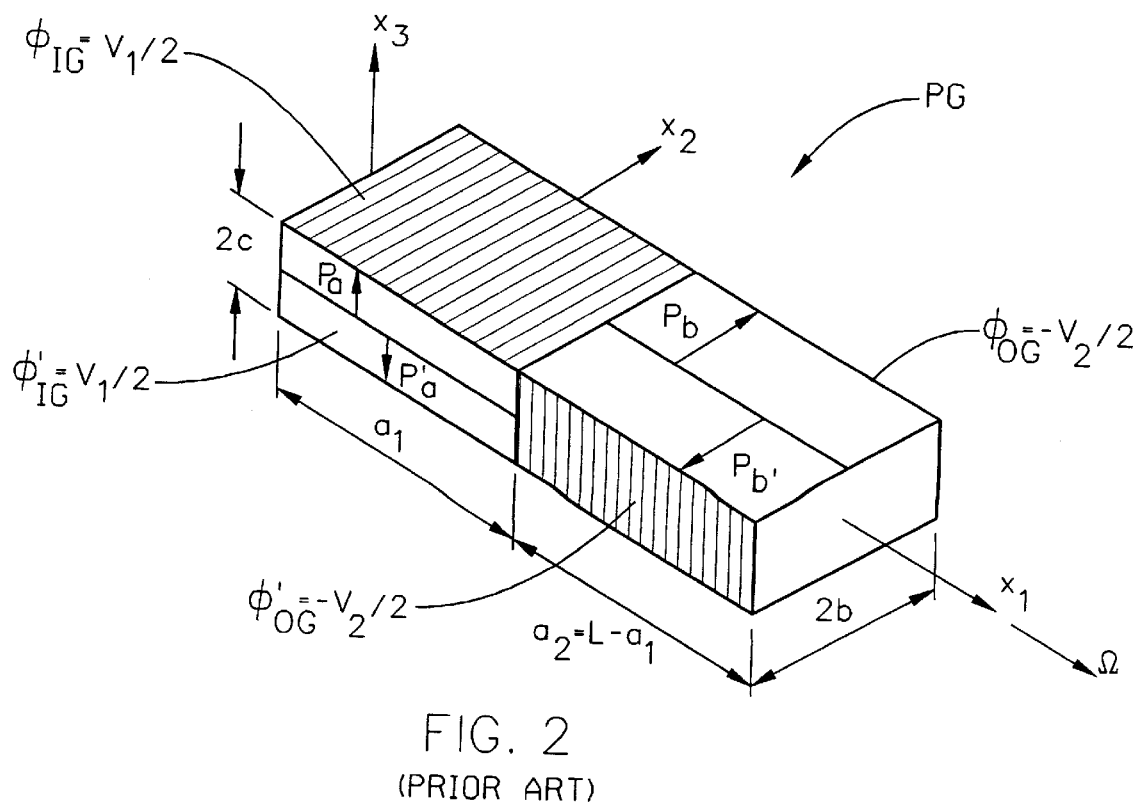
FIG. 2 shows a prior art Piezoelectric gyroscope.

Turning now to FIG. 2 there is shown a generally elongated rectangular solid shaped Piezoelectric gyroscope (PG) system which serves. to produce a voltage at sensing electrodes ($\Phi_{OG}$) and ($\Phi'_{OG}$) thereof which is proportional to an angular rotation velocity ($\Omega$) of said piezoelectric-gyroscope about a longitudinally oriented axis, (coincident with (x1)), therethrough. The mechanism of operation involves Coriolis force mediated flexure in a direction which is perpendicular to both said longitudinal axis (x1), and a direction of an applied driving voltage (in the (x3) direction). As viewed said piezoelectric gyroscope (PG) has, at the left longitudinally disposed side thereof, two vertically stacked regions of vertically oriented polarization direction (Pa) and (Pa') material sandwiched between driving voltage electrodes ($\Phi_{IG}$) and ($\Phi'_{IG}$) attached thereto at upper and lower surfaces. One of said vertically stacked regions of vertically oriented polarization direction ($P_a$) material has, as viewed, an "upward" polarization direction and the other ($P_a'$) a "downward" polarization direction. On the right longitudinally disposed side thereof, as viewed, there are present two adjacent regions of horizontally oriented polarization ($P_b$) and ($P_b'$) direction material, (ie. ($P_b'$) is in front of the ($P_b$) other as viewed), sandwiched between sensing voltage electrodes ($\Phi_{OG}$) and ($\Phi'_{OG}$) attached thereto at front and back vertically oriented surfaces. One said adjacent region of horizontally oriented polarization direction ($P_b$) material having, as viewed, a horizontally lateral, (into the paper), projecting polarization and the other said adjacent region of horizontally oriented polarization direction ($P_b'$) material having a horizontal lateral, (out of the paper), oriented polarization direction. The plane of the polarization directions on said second longitudinally disposed side is rotated ninety (90) degrees, (eg. horizontally oriented), from the plane of the polarization directions, (eg. vertically oriented), on said first longitudinally disposed side.

In use said Piezoelectric gyroscope is caused to rotate at an angular rotation velocity ($\Omega$) about said longitudinally oriented axis (xl) which projects essentially centrally therethrough from said first longitudinally disposed side to said second longitudinally disposed side, and a flex producing voltage (V1) is applied, as shown, across the driving electrodes as ($\Phi_{IG}$) and ($\Phi'_{IG}$), while an output voltage (V2) is sensed, as shown, across said sensing electrodes as ($\Phi_{OG}$) and ($\Phi'_{OG}$). When both angular rotation velocity ($\Omega$) about said longitudinally oriented axis (xl) therethrough, and flex effecting voltage (V1) is present across the driving electrodes ($\phi_{IG}$) and ($\phi'_{IG}$), it occurs that, (through the mechanism of Coriolis force), a voltage (V2) appears at the sensing electrodes as ($\phi_{OG}$) and ($\phi'_{OG}$) which is related to said angular rotation velocity ($\Omega$) about said longitudinally oriented axis (x1) therethrough. Where the angular rotational velocity ($\Omega$) about said longitudinally oriented axis (x1) therethrough is at least an order of magnitude less than is natural vibrational frequency(s) of the piezoelectric gyroscope material, the output voltage (V2) at the sensing electrodes is directly proportional to said angular rotational velocity ($\Omega$).

Figure 3:
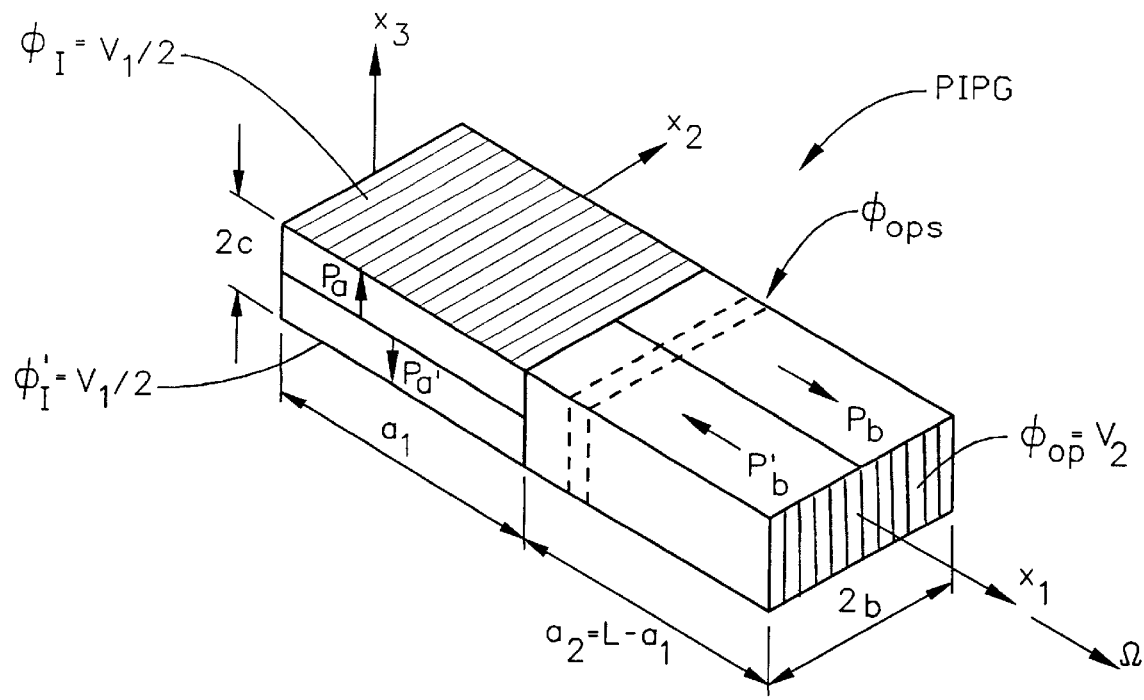
FIG. 3 shows a present invention voltage amplifying Piezoelectric pyroscope system.

FIG. 3 shows that the present invention couples the voltage amplification benefits of piezoelectric (Rosen) transformers (PT), to the angular velocity measuring capabilities of piezoelectric gyroscopes (PG) by placing a sensing electrode ($\Phi_{OP}$) in a present invention piezoelectric-gyroscope (PIPG) much as is practiced in piezoelectric-transformers (PT), (ie. at the vertically oriented end of the longitudinally disposed side of the present invention piezoelectric-gyroscope at which is present the two regions of horizontally longitudinally oriented polarization direction material as demonstrated in FIG. 1). That is, the two sensing electrodes ($\Phi_{OG}$) and ($\Phi'_{OG}$) in a conventional FIG. 2 demonstrated piezoelectric-gyroscope (PG) are, in the present invention preferred embodiment, replaced by a single FIG. 3 demonstrated electrode ($\Phi$op) at the vertically oriented end of the longitudinally disposed side of the present invention piezoelectric-gyroscope (PIPG) at which is present the two adjacent regions of horizontally longitudinally oriented polarization direction material ($P_b$) and ($P_b'$). Said single electrode ($\Phi_{op}$) can reference to one of the driving electrodes, or to a second sensing electrode as demonstrated by ($\Phi_{ops}$).

Figure 4:
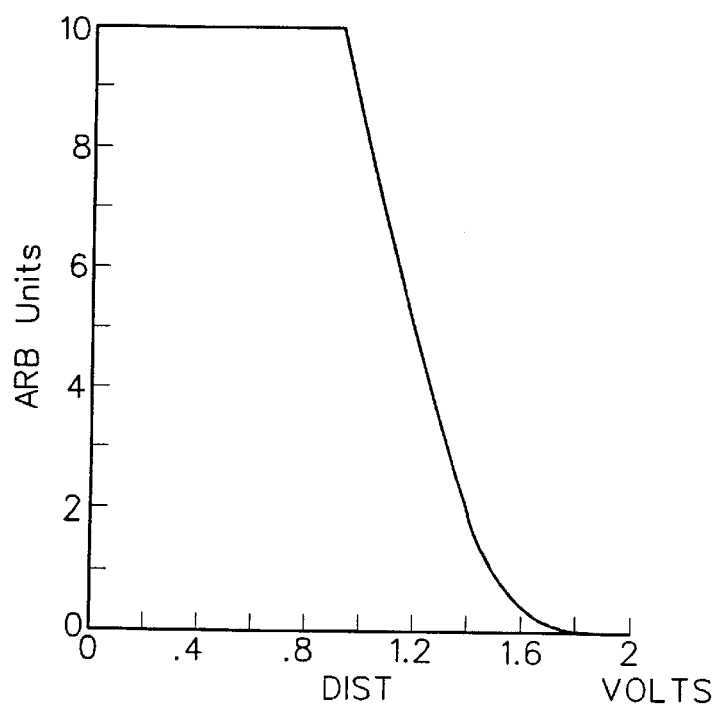
FIG. 4 shows a simulated voltage levels longitudinally along a present invention voltage amplifying Piezoelectric gyroscope system as a function of "flex" thereof, which flex results from combined application of a flex effecting driving force voltage and rotation about a longitudinal axis in use.

FIG. 4 shows a plot of voltage levels present in a present invention voltage amplifying Piezoelectric Gyroscope system caused by "flex" thereof, which flex is the result of combined application of driving force voltage and rotation about a longitudinal axis in use. Said plot was produced utilizing a mathematical finite element approach. Note that the "flat" portion of said curve corresponds to applied driving side voltage, and that the remainder of said plot indicates that voltage varies therefrom as one progresses toward the sensing electrode ($\phi_{op}$)

Figure 5A:
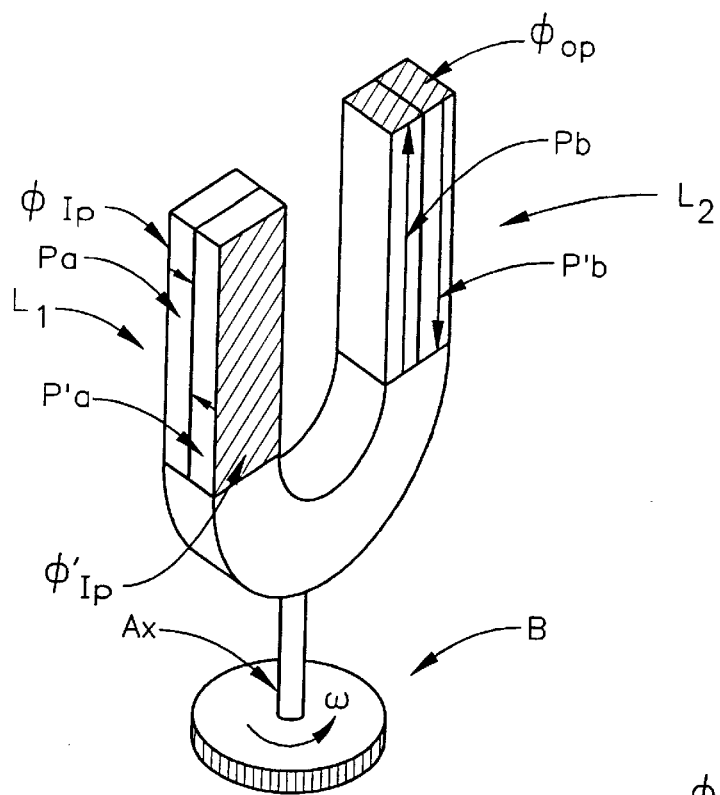
FIG. 5a shows a Tuning-fork Piezoelectric Gyroscope fashioned from a single present invention voltage amplifying Piezoelectric gyroscope system.

FIG. 5a shows a Tuning-fork Piezoelectric Gyroscope fashioned from a single present invention voltage amplifying Piezoelectric gyroscope system. The first leg (L1), which projects from the rotatable base has the leftmost longitudinal driving side elements shown in FIG. 3, (eg. ($P_a$) ($P_a'$) ($\phi_{Ip}$) and ($\phi'_{Ip}$), while the second leg (L2) has the rightmost longitudinal sensing side elements shown in FIG. 3, (eg. ($P_b$) ($P_b'$) and ($\Phi$OP). and In use an output voltage is sensed at ($\phi_{op}$) while a flex effecting voltage is applied across driving electrodes ($\Phi_{Ip}$) and ($\Phi'_{Ip}$) while the indicated angular velocity ($\omega$) is imposed.

Figure 5B:
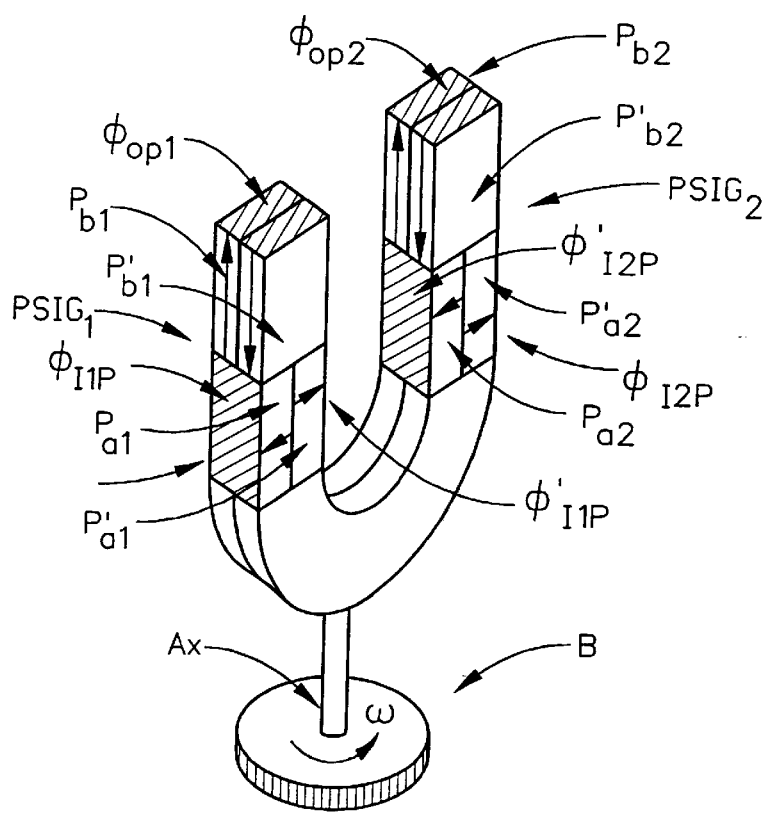
FIG. 5b shows a Tuning-fork Piezoelectric Gyroscope fashioned from two present invention voltage amplifying Piezoelectric gyroscope systems.

FIG. 5b shows a Tuning-fork Piezoelectric Gyroscope fashioned from two complete present invention voltage amplifying Piezoelectric gyroscope systems as demonstrated in FIG. 3. In use an output voltage is sensed between ($\Phi$op1) and ($\Phi$op2) while a flex effecting voltage is applied across driving electrodes ($\Phi^{hd\ I1P}$) & ($\Phi'$I1P) and across ($\phi_{I2P}$) & ($\phi'_{I2P}$) while the indicated angular velocity ($\omega$) is imposed.

A more detailed description of FIG. 5b provides that the Tuning-fork piezoelectric gyroscope system is described as comprising, as viewed in upright frontal elevation, a horizontally oriented base (B) from which vertically project two independent piezoelectric gyroscope systems, (PSIG1) and (PSIG2). As described infra herein, each of said independent piezoelectric gyroscope systems (PSIG1) and (PSIG2) couples the voltage amplification benefits of piezoelectric (Rosen) transformers to the angular velocity measuring capabilities of conventional piezoelectric gyroscopes, and each thereof comprising a generally elongated rectangular solid shaped block of piezoelectric material having first and second longitudinally disposed sides. At the first longitudinally disposed side of each thereof are present two stacked regions of oppositely oriented polarization direction material ($P_{a1}$) & ($P_{a1}'$) and ($P_{a2}$) & ($P_{a2}'$) sandwiched between driving voltage electrodes ($\phi_{I1P}$) & ($\phi'_{I1P}$) and ($\phi_{I2P}$) & ($\phi'_{I2P}$) repectively, one of said stacked regions of oppositely oriented polarization direction material ($P_{a1}'$) & ($P_{a2}'$) having a relative "to the right" polarization direction and the other ($P_{a1}$) & ($P_{a2}$) a relative "to the left" polarization direction. On the second longitudinally disposed side of each thereof are two adjacent regions of oppositely oriented polarization direction material ($P_{b1}$) and ($P_{b1}'$) and ($P_{b2}$) & ($P_{b2}'$), one said adjacent region of oppositely oriented polarization ($P_{b1}$) & ($P_{b2}$) direction material having a relative longitudinal "upward" projecting polarization and the other ($P_{b1}'$) & ($P_{b2}'$) said adjacent region of oriented polarization direction material having a relative longitudinal "downward" oriented polarization direction, the plane of the polarization directions on said second longitudinally disposed side being rotated ninety (90) degrees from the plane of the polarization directions on said first longitudinally disposed side. Each of said independent piezoelectric-gyroscope systems (PSIG1) and (PSIG2) has a sensing electrode ($\Phi_{op1}$) & ($\Phi_{op2}$) present at an essentially horizontally oriented end of the second longitudinally disposed side of thereof; such that in use said base (B) is caused to rotate at an angular rotation velocity ($\omega$) about an axis (AX) which projects essentially centrally between said two independent piezoelectric-gyroscope systems (PSIG1) and (PSIG2) and a flex effecting voltage is applied across the driving electrodes of each of said two independent piezoelectric gyroscope systems ($\Phi_{I1P}$) & ($\Phi'_{I1P}$) and ($\Phi_{I2P}$) & ($\Phi'_{I2P}$), while an output voltage is sensed between the sensing electrode of one of said independent piezoelectric-gyroscope system and that of the other (eg. ($\Phi_{op1}$) & ($\Phi_{op2}$).

For emphasis, it is again noted that as described in the Disclosure of the Invention Section of this Disclosure, a distinguishing element of any embodiment of a present invention piezoelectric gyroscope system is the use of longitudinal electric field in the sensing portion, and the presence of a sensing electrode present at a longitudinal end thereof, said sensing electrode being oriented other than longitudinally, but instead being oriented generally perpendicularly to said longitudinal direction. In contrast, conventional piezoelectric gyroscopes use lateral or transverse electric fields with electrodes present on sides thereof.

It is emphasized that the present invention is found in the coupling of Piezoelectric Transformer and Piezoelectric Gyroscope systems into an combined, (eg. integrated), present invention Piezoelectric Gyroscope which provides, in use, an amplified output voltage which is proportional to a monitored rotational angular velocity.

It is to be understood that the present invention Piezoelectric Gyroscopes were described herein as viewed in certain specified orientations to facilitate discussion of relative positioning of various elements thereof. This is not to be interpreted as limiting in that, for instance, a present invention Piezoelectric Gyroscope as viewed in FIG. 3 can be viewed as translated and/or rotated about any axis and remain functionally unchanged. That is, use of terminology "upward" and "downward" and "to the left and "to the right" in the claims is then not to be interpreted to limit the invention, but rather is utilized solely to facilitate description thereof and is to be considered as describing directions relative to one another. Also, the terminology "longitudinal" is generally utilized to indicate an elongated dimension direction in a present invention Piezoelectric Gyroscope, with the terminology "lateral" indicating a direction which is perpendicular to said elongated direction.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

I claim:

1. A piezoelectric gyroscope which couples the voltage amplification benefits of piezoelectric (Rosen) transformers to the angular velocity measuring capabilities of conventional piezoelectric gyroscopes, comprising a generally elongated rectangular solid shaped block of piezoelectric material having first and second longitudinally disposed sides and a longitudinally oriented axis which projects essentially centrally therethrough from said first longitudinally disposed side to said second longitudinally disposed side; there being at the first longitudinally disposed side thereof two stacked regions of oppositely oriented polarization direction material sandwiched between driving voltage electrodes, one of said stacked regions of oppositely oriented polarization direction material having, as viewed in frontal elevation, a relative "upward" polarization direction and the other a relative "downward" polarization direction; and there being on the second longitudinally disposed side thereof two adjacent regions of oppositely oriented polarization direction material, one said adjacent region of oppositely oriented polarization direction material having a relative longitudinal "to the right" projecting polarization direction and the other said adjacent region of oriented polarization direction material having a relative longitudinal "to the left" oriented polarization direction, the plane of the polarization directions on said second longitudinally disposed side being rotated ninety (90) degrees from the plane of the polarization directions on said first longitudinally disposed side;

said piezoelectric-gyroscope having a sensing electrode present at the end of the second longitudinally disposed side of the present invention piezoelectric-gyroscope;

such that in use said piezoelectric gyroscope is caused to rotate at an angular rotation velocity about said longitudinally oriented axis which projects essentially centrally therethrough from said first longitudinally disposed side to said second longitudinally disposed side, and a flex effecting voltage is applied across the driving electrodes, while an output voltage is sensed at said sensing electrode, to the end that when both angular rotation velocity about said longitudinally oriented axis which projects essentially centrally therethrough from said first longitudinally disposed side to said second longitudinally disposed side, and flex effecting voltage is applied across the driving electrodes, it occurs that, through the mechanism of Coriolis force, a voltage which is related to said angular rotation velocity about said longitudinally oriented axis therethrough, appears at the sensing electrode.

2. A piezoelectric gyroscope which couples the voltage amplification benefits of piezoelectric (Rosen) transformers as in claim 1, wherein the angular rotational velocity about said longitudinally oriented axis which projects essentially centrally therethrough from said first longitudinally disposed side to said second longitudinally disposed side is at least an order of magnitude less than is a natural vibrational frequency of the generally elongated rectangular solid shaped block of piezoelectric material of said piezoelectric gyroscope, and the output voltage at the sensing electrodes is, as a result, essentially directly proportional to said angular rotational velocity.

3. A piezoelectric gyroscope which couples the voltage amplification benefits of piezoelectric (Rosen) transformers as in claim 1, wherein the rectangular solid shaped block of piezoelectric material is ceramic.

4. A piezoelectric gyroscope which couples the voltage amplification benefits of piezoelectric (Rosen) transformers as in claim 2, wherein the rectangular solid shaped block of piezoelectric material is ceramic.

5. A piezoelectric gyroscope as in claim 1, which is oriented such that at least one of the relative "upward" polarization direction and the relative "downward" polarization direction, and relative longitudinal "to the right" projecting polarization direction and the relative longitudinal "to the left" oriented polarization direction is/are not necessartily aligned with respect to an external frame of reference.

6. A piezoelectric gyroscope which couples the voltage amplification benefits of piezoelectric (Rosen) transformers to the angular velocity measuring capabilities of conventional piezoelectric gyroscopes, comprising a generally elongated three dimensional mass of piezoelectric material having first and second longitudinally disposed sides and a longitudinally oriented axis which projects essentially centrally therethrough from said first longitudinally disposed side to said second longitudinally disposed side; there being at the first longitudinally disposed side thereof two stacked regions of oppositely oriented polarization direction material sandwiched between driving voltage electrodes, one of said stacked regions of oppositely oriented polarization direction material having, as viewed in frontal elevation, a relative "upward" polarization direction and the other a relative "downward" polarization direction; and there being on the second longitudinally disposed side thereof two adjacent regions of oppositely oriented polarization direction material, one said adjacent region of oppositely oriented polarization direction material having a relative longitudinal "to the right" projecting polarization direction and the other said adjacent region of oriented polarization direction material having a relative longitudinal "to the left" oriented polarization direction, the plane of the polarization directions on said second longitudinally disposed side being rotated ninety (90) degrees from the plane of the polarization directions on said first longitudinally disposed side;

said piezoelectric-gyroscope having a sensing electrode present at the end of the second longitudinally disposed side of the present invention piezoelectric-gyroscope;

such that in use said piezoelectric gyroscope is caused to rotate at an angular rotation velocity about said longitudinally oriented axis which projects essentially centrally therethrough from said first longitudinally disposed side to said second longitudinally disposed side, and a flex effecting voltage is applied across the driving electrodes, while an output voltage is sensed at said sensing electrode, to the end that when both angular rotation velocity about said longitudinally oriented axis which projects essentially centrally therethrough from said first longitudinally disposed side to said second longitudinally disposed side, and flex effecting voltage is applied across the driving electrodes, it occurs that, through the mechanism of Coriolis force, a voltage which is related to said angular rotation velocity about said longitudinally oriented axis therethrough, appears at the sensing electrode.

7. A piezoelectric gyroscope as in claim 6, which is oriented such that at least one of the relative "upward" polarization direction and the relative "downward" polarization direction, and relative longitudinal "to the right" projecting polarization direction and the relative longitudinal "to the left" oriented polarization direction is/are not necessartily aligned with respect to an external frame of reference.

8. A method of monitoring an angular rotation velocity comprising the steps of:

a. providing a piezoelectric gyroscope which couples the voltage amplification benefits of piezoelectric (Rosen) transformers to the angular velocity measuring capabilities of conventional piezoelectric gyroscopes, comprising a generally elongated rectangular solid shaped block of piezoelectric material having first and second longitudinally disposed sides and a longitudinally oriented axis which projects essentially centrally therethrough from said first longitudinally disposed side to said second longitudinally disposed side; there being at the first longitudinally disposed side thereof two stacked regions of oppositely oriented polarization direction material sandwiched between driving voltage electrodes, one of said stacked regions of oppositely oriented polarization direction material having, as viewed in frontal elevation, a relative "upward" polarization direction and the other a relative "downward" polarization direction; and there being on the second longitudinally disposed side thereof two adjacent regions of oppositely oriented polarization direction material, one said adjacent region of oppositely oriented polarization direction material having a relative longitudinal "to the right" projecting polarization direction and the other said adjacent region of oriented polarization direction material having a relative longitudinal "to the left" oriented polarization direction, the plane of the polarization directions on said second longitudinally disposed side being rotated ninety (90) degrees from the plane of the polarization directions on said first longitudinally disposed side;

said piezoelectric-gyroscope having a sensing electrode present at the end of the second longitudinally disposed side of the present invention piezoelectric-gyroscope;

such that in use said piezoelectric gyroscope is caused to rotate at an angular rotation velocity about said longitudinally oriented axis which projects essentially centrally therethrough from said first longitudinally disposed side to said second longitudinally disposed side, and a flex effecting voltage is applied across the driving electrodes, while an output voltage is sensed at said sensing electrode, to the end that when both angular rotation velocity about said longitudinally oriented axis which projects essentially centrally therethrough from said first longitudinally disposed side to said second longitudinally disposed side, and flex effecting voltage is applied across the driving electrodes, it occurs that, through the mechanism of Coriolis force, a voltage which is related to said angular rotation velocity about said longitudinally oriented axis therethrough, appears at the sensing electrode;

said method further comprising in a functional order the steps of:

b. causing said piezoelectric gyroscope to rotate about said longitudinally oriented axis which projects essentially centrally therethrough from said first longitudinally disposed side to said second longitudinally disposed side and applying a flex effecting voltage across the driving electrodes; and c. monitoring an output voltage at said sensing electrode, said monitored output voltage being related to said velocity of rotation about said longitudinally oriented axis which projects centrally therethrough from said first longitudinally disposed side to said second longitudinally disposed side.

9. A method of monitoring an angular rotation velocity as in claim 5 which further comprises the step of orienting the piezoelectric gyroscope such that at least one of the the relative "upward" polarization direction and the relative "downward" polarization direction, and relative longitudinal "to the right" projecting polarization direction and the relative longitudinal "to the left" oriented polarization direction is/are not necessarily aligned with respect to an external frame of reference.

10. A piezoelectric gyroscope system for sensing angular rotation velocity about a longitudinally oriented axis, comprising a generally longitudinally elongated three dimensional mass of piezoelectric material having first and second longitudinally disposed ends, said piezoelectric gyroscope system being distinguished in that a sensing electrode is present at one longitudinally disposed end thereof, said sensing electrode being affixed at said one longitudinally disposed end thereof in an orientation other than on a side thereof along the direction of longitudinal elongation, such that in use said piezoelectric gyroscope is caused to rotate at an angular rotation velocity about said longitudinally oriented axis and a voltage which is related to said angular rotation velocity about said longitudinally oriented axis appears at the sensing electrode, said voltage being related to said angular rotation velocity.

11. A piezoelectric gyroscope system as in claim 10 in which said sensing electrode is oriented essentially perpendicularly to the direction of longitudinal elongation.

12. A piezoelectric gyroscope as in claim 10, wherein the angular rotational velocity about said longitudinally oriented axis is at least an order of magnitude less than is a natural vibrational frequency of the generally elongated rectangular solid shaped block of piezoelectric material of said piezoelectric gyroscope, and the output voltage at the sensing electrode is, as a result, essentially directly proportional to said angular rotational velocity.

13. A Tuning-fork piezoelectric gyroscope system comprising, as viewed in upright frontal elevation, a horizontally oriented base from which vertically project two independent piezoelectric gyroscope systems, each said independent piezoelectric gyroscope system being a piezoelectric gyroscope which couples the voltage amplification benefits of piezoelectric (Rosen) transformers to the angular velocity measuring capabilities of conventional piezoelectric gyroscopes, and each thereof comprising a generally elongated rectangular solid shaped block of piezoelectric material having first and second longitudinally disposed sides and; there being at the first longitudinally disposed side thereof two stacked regions of oppositely oriented polarization direction material sandwiched between driving voltage electrodes, one of said stacked regions of oppositely oriented polarization direction material having, as viewed in frontal elevation, a relative "to the right" polarization direction and the other a relative "to the left" polarization direction; and there being on the second longitudinally disposed side thereof two adjacent regions of oppositely oriented polarization direction material, one said adjacent region of oppositely oriented polarization direction material having a relative longitudinal "upward" projecting polarization direction and the other said adjacent region of oriented polarization direction material having a relative longitudinal "downward" oriented polarization direction, the plane of the polarization directions on said second longitudinally disposed side being rotated ninety (90) degrees from the plane of the polarization directions on said first longitudinally disposed side;

each of said independent piezoelectric-gyroscope systems having a sensing electrode present at an essentially horizontally oriented end of the second longitudinally disposed side of thereof;

such that in use said base is caused to rotate at an angular rotation velocity about an axis which projects essentially centrally between said two independent piezoelectric-gyroscope systems and a flex effecting voltage is applied across the driving electrodes of each of said two independent piezoelectric gyroscope systems, while an output voltage is sensed between the sensing electrode of one of said independent piezoelectricgryoscope system and that of the other.

14. A Tuning-fork piezoelectric gyroscope system as in claim 13 which is oriented such that at least one of the relative "upward" polarization direction and the relative "downward" polarization direction, and relative longitudinal "to the right" projecting polarization direction and the relative longitudinal "to the left" oriented polarization direction is/are not necessartily aligned with respect to an external frame of reference.

* * * * *